(12) United States Patent
Lee et al.

(10) Patent No.: US 10,519,312 B2
(45) Date of Patent: Dec. 31, 2019

(54) ULTRA-THIN BLACK POLYIMIDE FILM AND METHOD FOR PREPARING THE SAME

(71) Applicant: SKC KOLON PI Inc., Jincheon-gun (KR)

(72) Inventors: Kil Nam Lee, Bucheon-si (KR); Jae Chul Ahn, Gumi-si (KR); In Seok Oh, Daegu (KR); Sang Hak Lee, Gumi-si (KR); Jae Baek Lee, Daegu (KR); Hyun Jai Lim, Gumi-si (KR)

(73) Assignee: SKC KOLON PI Inc., Jincheon-gun (KR)

( * ) Notice: Subject to any disclaimer, the term of this patent is extended or adjusted under 35 U.S.C. 154(b) by 0 days.

(21) Appl. No.: 15/720,753

(22) Filed: Sep. 29, 2017

(65) Prior Publication Data

US 2018/0346720 A1    Dec. 6, 2018

(30) Foreign Application Priority Data

May 30, 2017    (KR) .......................... 10-2017-0067058

(51) Int. Cl.

| | |
|---|---|
| *B32B 27/20* | (2006.01) |
| *C08L 79/08* | (2006.01) |
| *C08G 73/10* | (2006.01) |
| *C09C 1/48* | (2006.01) |
| *C08K 3/04* | (2006.01) |
| *C08J 3/21* | (2006.01) |
| *C08J 5/18* | (2006.01) |
| *C08J 3/215* | (2006.01) |
| *C09D 179/08* | (2006.01) |

(52) U.S. Cl.
CPC ............ *C08L 79/08* (2013.01); *C08G 73/105* (2013.01); *C08G 73/1007* (2013.01); *C08G 73/1042* (2013.01); *C08G 73/1071* (2013.01); *C08J 3/212* (2013.01); *C08J 3/215* (2013.01); *C08J 5/18* (2013.01); *C08K 3/04* (2013.01); *C09C 1/48* (2013.01); *C09D 179/08* (2013.01); *C01P 2004/61* (2013.01); *C08J 2379/08* (2013.01); *C08K 2201/003* (2013.01); *C08K 2201/005* (2013.01); *C08K 2201/011* (2013.01)

(58) Field of Classification Search
CPC ................................. C08J 5/18; C08J 9/0066; C08K 3/013; C09C 1/56; B32B 27/281; C08G 73/1067
See application file for complete search history.

(56) References Cited

U.S. PATENT DOCUMENTS

| | | | | |
|---|---|---|---|---|
| 3,024,092 | A | * | 3/1962 | Gessler .................... C08K 3/04 106/472 |
| 5,998,010 | A | * | 12/1999 | Schlueter, Jr. ....... G03G 7/0013 428/206 |
| 2015/0166833 | A1 | | 6/2015 | Carney et al. |
| 2018/0134862 | A1 | | 5/2018 | Nagahama |

FOREIGN PATENT DOCUMENTS

| | | | |
|---|---|---|---|
| KR | 101156084 | * | 6/2012 |
| KR | 10-2013-0069336 A | | 6/2013 |
| KR | 10-2015-0076525 | | 7/2015 |
| TW | 201313783 A1 | | 4/2013 |
| WO | 2015/094848 A1 | | 6/2015 |

\* cited by examiner

*Primary Examiner* — Gregory Listvoyb
(74) *Attorney, Agent, or Firm* — Jones Day

(57) ABSTRACT

The present invention relates to an ultra-thin black polyimide film and a method for preparing the same. The ultra-thin black polyimide film according to the present invention has a thickness of 8 μm or less, and has not only an excellent gloss and a low light transmittance in the range of visible light, but also an excellent dimensional stability so as to be effectively used in products such as slim devices, coverlays, insulating films, or semiconductor devices, which need to have a good mechanical or thermal properties.

7 Claims, No Drawings

ULTRA-THIN BLACK POLYIMIDE FILM AND METHOD FOR PREPARING THE SAME

CROSS REFERENCE TO THE RELATED APPLICATION

This application claims priority to Korean Patent Application No. 10-2017-0067058, filed on May 30, 2017, the entire contents of which are incorporated by reference herein.

TECHNICAL FIELD

The present invention relates to an ultra-thin black polyimide film and a method for preparing the same.

BACKGROUND

In general, a polyimide (hereinafter referred to as "PI") resin denotes a high heat-resistant resin which is prepared by solution polymerizing an aromatic acid dianhydride(s) and an aromatic diamine(s) or an aromatic diisocyanate(s) to produce a polyamic acid derivative, and then by carrying out a dehydration ring-closure reaction at a high temperature, followed by imidization.

A polyimide resin is generally prepared by polymerizing an aromatic acid dianhydride(s), such as pyromellitic dianhydride (PMDA), biphenyl tetracarboxylic dianhydride (BPDA), etc. and an aromatic diamine component(s), such as oxydianiline (ODA), p-phenylenediamine (p-PDA), m-phenylenediamine (m-PDA), methylene dianiline (MDA), bisaminophenyl hexafluoropropane (HFDA), etc.

A polyimide resin is ultra-highly heat-resistant, insoluble, and non-meltable with excellent properties, such as thermo-oxidative stability, excellent heat-resistance, radiation resistance, low temperature properties, or chemical-resistant properties, and thus, is finding wide applications in a variety of fields including those of advanced heat-resistant materials, such as automotive materials, aircraft materials, spacecraft materials, etc., and electronic materials such as insulation coating materials, insulating films, semiconductors, electrode protective films for TFT-LCDs, etc.

Recently, such a resin is widely used as coverlays for portable electronics and communication devices. Coverlays are known as barrier films for protecting electronic components such as printed circuit boards, leadframes of integrated circuit packages and the like. A need exists, however, for coverlays to be increasingly thin and slim, while having security, portability, visual effects and optical properties including shielding for electronic components or mount components.

For example, the Korean Patent Publication No. 10-2015-0076525 discloses an adhesive composition comprising (A) a non-halogen based epoxy resin, (B) a thermoplastic resin, (C) a curing agent and (D) an inorganic filler, a copper clad laminate and a coverlay film using the same. It describes, however, that said film has a thickness of 5 to 200 μm, which still fails to meet the slimness requirement.

SUMMARY OF THE INVENTION

Accordingly, the present invention is to provide an ultra-thin black polyimide film having excellent optical properties such as gloss, transmittance, etc., wherein the film has a thickness of 8 μm or less.

In order to achieve the purpose of the present invention explained above, the present invention provides an ultra-thin black polyimide film obtained by imidization of a polyamic acid resulting from dianhydrides and diamines, wherein the film comprises 3 to 10 wt % of a first carbon black having a mean particle diameter of 1 to 5 μm and 1 to 5 wt % of a second carbon black having a mean particle diameter of 0.1 to 0.99 μm, based on the total weight of the film, respectively, with a light transmittance of 10% or less in the range of visible light, a gloss of 10 to 40%, and a thickness of 8 μm or less.

Further, in order to achieve the other purpose of the present invention, the present invention provides a method for preparing an ultra-thin black polyimide film comprising, (1) a step of polymerizing a polyamic acid solution from dianhydrides and diamines, (2) a step of preparing a first carbon black having a mean particle diameter of 1 to 5 μm and a second carbon black having a mean particle diameter of 0.1 to 0.99 μm, respectively, using a mill machine, (3) a step of mixing and dispersing the first carbon black and the second carbon black in said polyamic acid solution to form a coating on a support, (4) a step of thermally treating the coating to lead imidization, and (5) a step of cooling to obtain a film.

The ultra-thin black polyimide film according to the present invention has a thickness of 8 μm or less, and has not only an excellent gloss and a low light transmittance in the range of visible light, but also an excellent dimensional stability so as to be effectively used in products such as slim devices, coverlays, insulating films, or semiconductor devices, which need to have a good mechanical or thermal properties.

DETAILED DESCRIPTION

The present invention will be explained in more details below.

The present invention provides an ultra-thin black polyimide film obtained by imidization of a polyamic acid resulting from dianhydrides and diamines, wherein the film comprises 3 to 10 wt % of a first carbon black having a mean particle diameter of 1 to 5 μm and 1 to 5 wt % of a second carbon black having a mean particle diameter of 0.1 to 0.99 μm, based on the total weight of the film, respectively, with a light transmittance of 10% or less in the range of visible light, a gloss of 10 to 40%, and a thickness of 8 μm or less.

Said ultra-thin black polyimide film can have a thickness of 8 μm or less, specifically 5 to 8 μm. Additionally, said film can have a light transmittance in the range of visible light of 10% or less, or 9.7% or less in order to shade the light, and a gloss of 10 to 40%, or 13 to 40%. The lower those values are, the more preferable they are. Said film can not only make the products slimmer when applied to colverlays, insulating films or semiconductors, etc., but also improve their aesthetic features and shield the interior shape and charging parts, which is useful for security.

Said dianhydrides can be at least one selected from the group consisting of pyromellitic dianhydride (PMDA), biphenyl tetracarboxylic dianhydride (BPDA) and oxydiphthalic anhydride (ODPA), specifically, PMDA.

Furthermore, said diamines can be at least one selected from the group consisting of 1,4-phenylenediamine, oxydianiline, 4,4'-methylenedianiline (MDA), and 1,3-bis(4-aminophenoxy)benzene(TPE-R), specifically, 1,4-phenylenediamine and oxydianiline.

Said 1,4-phenylenediamine can be comprised in 20 to 30 mol % based on the total diamines. Thus, a Coefficient of Thermal Expansion(CTE) in a longitudinal (MD) direction and transverse (TD) direction remains low within said range, and results in better dimensional stability. It is because said 1,4-phenylenediamine is a monomer of a linear structure to lower the CTE of the film. Specifically, said black polyimide film can have a CTE of 10 to 20 ppm/° C. If the amount of said 1,4-phenylenediamine exceeds 30 mol %, then the film will have a lower flexibility and will be unlikely to be molded to a film shape.

Further, carbon black can be comprised in said black polyimide film to impart the black color to the film as well as the gloss. Specifically, said carbon black can have a mean particle diameter of less than 20 μm, and within this range, the ultra-thin black polyimide film of a thickness of 8 μm or less can be embodied.

Also, the gloss and transmittance can remain low because of carbon black having a variety of diameter sizes comprised in the film.

Specifically, the lower level of a gloss (at 600) of 10 to 40% can be achieved by comprising 3 to 10 wt % of the first carbon black, based on the total weight of said film, having a mean particle diameter of 1 to 5 μm (d50), or 1.5 to 4.5 μm (d50). Further, the light transmittance of 10% or less can be achieved in the range of visible light by comprising 1 to 5 wt % of the second carbon black having a mean particle diameter of 0.1 μm or less(d50), or 0.1 to 0.99 μm (d50).

The present invention provides a method for preparing an ultra-thin black polyimide film comprising, (1) a step of polymerizing a polyamic acid solution from dianhydrides and diamines, (2) a step of preparing a first carbon black having a mean particle diameter of 1 to 5 μm and a second carbon black having a mean particle diameter of 0.1 to 0.99 μm, respectively, using a mill machine, (3) a step of mixing and dispersing the first carbon black and the second carbon black in said polyamic acid solution to form a coating on a support, (4) a step of thermally treating the coating to lead imidization, and (5) a step of cooling to obtain a film.

Dianhydrides and diamines which can be used in said step (1) are as explained above. Said dianhydrides and diamines can be reacted in an organic solvent to provide a polyamic acid solution, wherein the solvent can be generally an amide-based solvent, specifically, a polar solvent, for example, N,N'-dimethylformamide, N,N'-dimethylacetamide, N-methylpyrrolidone, etc., or the combination of two or more of them, if necessary.

The particle diameter of the carbon black can be controlled by using a bead mill in said step (2). The milling process is carried out to guarantee a homogeneous mixture of a carbon black having a low particle diameter distribution and a polyamic acid when they are mixed and to adjust the gloss and transmittance to the lower level.

Specifically, the bead mill with beads having a particle diameter of 1.0 to 2.0 mm can be used at a rotational speed of 500 rpm for 30 min to 90 min to prepare the first carbon black having the said range of particle diameters. Further, the bead mill with beads having a particle diameter of 0.8 to 1.5 mm can be used at a rotational speed of 700 rpm for 40 min to 120 min to prepare the second carbon black having the said range of particle diameters. At this time, when milling the first carbon black and the second carbon black, a refrigerant needs to be provided to keep the temperature of 20 to 40° C. When the temperature is within said range, particles are likely to be dispersed and their dispersion results can be also reproduced repeatedly. Further, since the temperature does not exceed a flash point of the organic solvent, the safety in the process is enhanced and the working efficiency can be increased.

The first carbon black and the second carbon black can be mixed in the prepared polyamic acid solution and dispersed therein in said step (3), wherein 3 to 10 wt % of said first carbon black and 1 to 5 wt % of the second carbon black, based on the total weight of said film, respectively, can be mixed and wherein said carbon blacks (including the first carbon black and the second carbon black) can be mixed as a form of a solution with the carbon blacks dispersed in a polar solvent. Said polar solvent can be at least one protic polar solvent selected from the group consisting of N,N'-dimethylformamide, N,N'-dimethylacetamide, and N-methyl-pyrrolidone.

Additionally, catalysts can be added to the mixture solution of said carbon blacks and said polyamic acid in said step (3) to form a coating on the support, wherein the catalysts can include a dehydration catalyst consisting of anhydrides such as an acetic acid anhydride and tertiary amines such as isoquinoline, R-picoline or pyridine, or the anhydride/amine mixture or the anhydride/amine/solvent mixture thereof.

The added amount of the anhydrides can be 1.0 to 5.0 moles, when calculated in a molar ratio of o-carboxylic amide functional group to the polyamic acid solution and the added amount of the tertiary amines can be 0.2 to 3.0 moles, when calculated in a molar ratio of o-carboxylic amide functional group to the polyamic acid solution.

Said step (4) is carried out to thermally treat the polyamic acid solution applied on the support and to gelate it, and the gelation temperature condition can be from 100 to 250° C. Said support can include a glass plate, an aluminum foil, an endless stainless steel belt, a stainless steel drum, etc.

The treatment period necessary for gelation can be from 5 to 30 min, but is not limited thereto, and it can depend on the gelation temperature, type of a support, amount of the polyamic acid solution applied, condition of mixing catalysts.

The gelated film can be removed from the support and subject to a thermal treatment to complete its drying and imidization. The thermal treatment temperature can be from 100 to 500° C., and the thermal treatment period can be from 1 min to 30 min. For the thermal treatment, the gelated film can be held on a fixable support such as a pin-type frame or a clip-type and thermally treated.

On the other hand, the process conditions such as the delivery amount, speed, or pressure should be controlled at the time of applying the polyamic acid to the support at any thickness to obtain the ultra-thin film of a thickness of 8 μm or less in said step (4).

In particular, trembling at the point when the polyamic acid solution is delivered onto the endless belt from a T-die and lands as a coating thereon, should be minimized. In order to minimize it, air can be provided at a lower pressure than the one used at the time of manufacturing regular polyimide films, for example the pressure from 10 to 40 mm $H_2O$ when the coating is formed from the delivery. At this time, the amount delivered from the T-die and the speed of the endless belt can satisfy the following formula, and for example, the amount delivered from the T-die can be from 150 kg/hr to 300 kg/hr, and the speed of the endless belt can be from 15 mpm to 25 mpm:

Amount delivered from the T-die/Period spent on the delivery from the T-die=Specific gravity of the film*(T-die cross section)*(Speed of the endless belt)     [Formula]

While, at a laboratory level, an ultra-thin polyimide film can be obtained by adjusting the casting film thickness without controlling said amount of delivery, speed, etc., in mass production, an ultra-thin thickness of 8 μm or less can be achieved with working processes including a casting process going smoothly, only if the said conditions are satisfied.

Further, when the thermal treatment is carried out using an equipment such as a tenter dryer after fixing the resulting product on a pin-type frame, in order to prevent fracture of the film during the thermal treatment process, it can be carried out at a temperature which is lower by 50 to 150° C. than the one of the maximum thermal treatment temperature at the time of preparing a yellow polyimide film having the same thickness.

In said step (5), the film whose imidization is complete can be cooled down to the temperature from 20 to 30° C. to obtain a film.

As explained above, the ultra-thin black polyimide film prepared using the said method can have a thickness of 8 μm or less, with a light transmittance of 10% or less in the range of visible light, a gloss of 10 to 40%, and a Coefficient of Thermal Expansion of 10 to 20 ppm/° C.

As explained above, the ultra-thin black polyimide film according to the present invention has a thickness of 8 μm or less, and has not only an excellent gloss and a low light transmittance in the range of visible light, but also an excellent dimensional stability so as to be effectively used in products such as slim devices, coverlays, insulating films, or semiconductor devices, which need to have a good mechanical or thermal properties.

The invention will be further described through the following examples and comparative examples below. The following examples are set forth to illustrate, but are not to be construed to limit the present invention.

EXAMPLES

Example 1. The Preparation of an Ultra-Thin Black Polyimide Film (Thickness: 7.5 μm)

In the process of polymerizing a polyamic acid solution, 733.5 g of N,N'-dimethylformamide(DMF) as a solvent was added to a 300 L reactor under nitrogen atmosphere. At 25° C., 63.25 g of 4,4'-diaminophenyleneether(ODA) and 11.39 g of 1,4-phenylenediamine (PPD), as diamines, were added. After stirring the monomers for about 30 min and confirming their complete dissolution, 91.86 g of pyromellitic dianhydride (PMDA) was added. After the addition is complete, a stirring process for one hour while keeping the same temperature was carried out to polymerize the polyamic acid solution.

1.75 g of the first carbon black (the mean particle diameter: 3.2 μm), and 0.78 g of the second carbon black (the mean particle diameter: 0.4 μm) were added to 40 g of the said polyamic acid solution; 2.25 g of isoquinoline (IQ), 10.66 g of acetic anhydride(AA), and 5.09 g of DMF, as catalysts, were added, and homogeneously mixed; and the resulting product was cast on a SUS plate (100SA, Sandvik) using a doctor blade into a 75 μm film, and then dried in the temperature range of from 100 to 200° C. Next, the film was removed from the SUS plate, fixed onto a pin frame and then moved to a high temperature tenter. After heating the film on the high temperature tenter from 200° C. to 600° C., cooling down to 25° C., and removing it from the pin frame, the ultra-thin black polyimide film of a 7.5 μm thickness was obtained.

Examples 2 to 8 and Comparative Examples 1 to 4. The Preparation of an Ultra-Thin Black Polyimide Film (Thickness: 7.5 μm)

A 7.5 μm thick ultra-thin black polyimide film was manufactured in the same manner as in Example 1, with the exception that the mean particle diameters and amounts of the first carbon black and the second carbon black shown in Table 1 below were used.

Examples 9 to 13 and Comparative Examples 5 to 8. The Preparation of an Ultra-Thin Black Polyimide Film (Thickness: 5 μm)

A 5 μm thick ultra-thin black polyimide film was manufactured in the same manner as in Example 1, with the exception that the mean particle diameters and amounts of the first carbon black and the second carbon black shown in Table 2 below were used, and the resulting product was cast on the SUS plate using the doctor blade into a 50 μm film.

Examples 14 to 18 and Comparative Examples 9 and 10. The Preparation of an Ultra-Thin Black Polyimide Film (Thickness: 7.5 μm)

A 7.5 μm thick ultra-thin black polyimide film was manufactured in the same manner as in Example 1, with the exception that the amount of PPD shown in Table 3 below was used.

Examples 19 to 23 and Comparative Examples 11 and 12. The Preparation of an Ultra-Thin Black Polyimide Film (Thickness: 5 μm)

A 5 μm thick ultra-thin black polyimide film was manufactured in the same manner as in Example 1, with the exception that the amount of PPD shown in Table 4 below was used, and the resulting product was cast on the SUS plate using the doctor blade into a 50 μm film.

Experiment Examples

Experiment Example 1. Gloss Test

Gloss measurement was done using a glossmeter (Model name: E406L, Manufacturer: Elcometer) at an angle of 60° according to the ASTM D523 method.

Experiment Example 2. Transmittance Test

Transmittance measurement was done using a transmittance measuring equipment (Model name: ColorQuestXE, Manufacturer: HunterLab) in the range of visible light according to the ASTM D1003 method.

Experiment Example 3. Dimensional Stability Test—Coefficient of Thermal Expansion(CTE)

Using a thermal analyzer (Model name: Q400, Manufacturer: TA), the film was heated to the temperature of 400° C. at a rate of 10° C./min under a pressure of 0.05N and then cooled down to 40° C. again at a rate of 10° C./min. Then, the temperature was elevated to 400° C. at a rate of 10° C./min, and the gradient of the elevation area between 100 and 200° C. was determined.

TABLE 1

| Thickness 7.5 μm | The First Carbon Black | | The Second Carbon Black | | Properties | |
|---|---|---|---|---|---|---|
| | wt % | Mean Diameter d50 (μm) | wt % | Mean Diameter d50 (μm) | Gloss (60°) | Transmittance (%) |
| Example 1 | 4.5 | 3.2 | 2.0 | 0.4 | 33 | 3.1% |
| Example 2 | 3.0 | 4.5 | 1.0 | 0.4 | 40 | 9.7% |
| Example 3 | 3.5 | 3.5 | 1.5 | 0.5 | 38 | 7.8% |
| Example 4 | 4.0 | 3.3 | 4.5 | 0.5 | 36 | 0.8% |
| Example 5 | 5.5 | 3.2 | 1.6 | 0.5 | 29 | 3.5% |
| Example 6 | 6.5 | 3.2 | 1.6 | 0.4 | 25 | 3.1% |
| Example 7 | 8.5 | 3.0 | 2.0 | 0.8 | 13 | 0.8% |
| Example 8 | 10.0 | 1.5 | 1.5 | 0.4 | 18 | 1.0% |
| Comparative Example 1 | 11.0 | 3.0 | 2.0 | 0.4 | 8 | 0.4% |
| Comparative Example 2 | 9.5 | 3.5 | 5.5 | 0.5 | 8 | 0.3% |
| Comparative Example 3 | 2.0 | 3.0 | 5.0 | 0.4 | 55 | 1.2% |
| Comparative Example 4 | 5.0 | 3.5 | 0.5 | 0.5 | 33 | 12.8% |

TABLE 2

| Thickness 5 μm | The First Carbon Black | | The Second Carbon Black | | Properties | |
|---|---|---|---|---|---|---|
| | wt % | Mean Diameter d50 (μm) | Wt % | Mean Diameter d50 (μm) | Gloss (60°) | Transmittance (%) |
| Example 9 | 3.0 | 4.0 | 2.8 | 0.4 | 39 | 8.1% |
| Example 10 | 5.5 | 3.2 | 1.5 | 0.5 | 37 | 9.5% |
| Example 11 | 6.0 | 3.0 | 2.0 | 0.5 | 34 | 7.6% |
| Example 12 | 8.5 | 2.8 | 1.0 | 0.4 | 27 | 7.9% |
| Example 13 | 5.5 | 3.2 | 5.0 | 0.5 | 34 | 3.7% |
| Comparative Example 5 | 11.0 | 1.5 | 1.5 | 0.5 | 14 | 4.9% |
| Comparative Example 6 | 5.0 | 3.0 | 6.5 | 0.5 | 37 | 3.1% |
| Comparative Example 7 | 2.0 | 2.8 | 5.0 | 0.4 | 62 | 4.5% |
| Comparative Example 8 | 3.0 | 3.0 | 0.5 | 0.5 | 51 | 21.2% |

TABLE 3

| Thickness 7.5 μm | Coefficient of Thermal Expansion (ppm/° C.) | |
|---|---|---|
| | PPD (mol %) | MD | TD |
| Example 14 | 20.0 | 18.2 | 19.8 |
| Example 15 | 22.5 | 17.1 | 18.9 |
| Example 16 | 25.0 | 16.6 | 18.2 |
| Example 17 | 27.5 | 15.2 | 16.9 |
| Example 18 | 30.0 | 13.8 | 15.7 |
| Comparative Example 9 | 15.0 | 23.0 | 24.8 |
| Comparative Example 10 | 10.0 | 26.4 | 28.1 |

TABLE 4

| Thickness 5 μm | Coefficient of Thermal Expansion (ppm/° C.) | |
|---|---|---|
| | PPD (mol %) | MD | TD |
| Example 19 | 20.0 | 17.8 | 19.7 |
| Example 20 | 22.5 | 16.5 | 18.8 |
| Example 21 | 25.0 | 15.4 | 17.5 |
| Example 22 | 27.5 | 14.9 | 16.7 |
| Example 23 | 30.0 | 13.4 | 15.4 |
| Comparative Example 11 | 15.0 | 22.4 | 24.3 |
| Comparative Example 12 | 10.0 | 25.0 | 28.1 |

In view of Tables 1 to 4 above, while it is confirmed that the black polyimide films of comparative examples (wherein the amounts of the first carbon black and the second carbon black deviate from those defined in the present invention) have poor result in terms of at least one of the properties, that is, a gloss, a transmittance and a Coefficient of Thermal Expansion, it is indicated that the ultra-thin black polyimide films of a thickness of 8 μm or less prepared in the Examples can maintain the lower level of a gloss and a transmittance by comprising a certain amount of the first carbon black and the second carbon black having a different size of particle diameters, respectively, and thus, show an excellent shield effect. Also, it can be recognized that they have a low Coefficient of Thermal Expansion, and therefore, show an excellent dimensional stability.

What is claimed:
1. A method for preparing an ultra-thin black polyimide film for coverlay, comprising the steps of:
    (1) polymerizing dianhydrides and diamines to form a polyamic acid solution;
    (2) preparing a first carbon black having a mean particle diameter of 1 to 5 μm and a second carbon black having a mean particle diameter of 0.1 to 0.99 μm using a mill machine, where the first carbon black and second carbon black are milled at a temperature from 20 to 40° C.;
    (3) dispersing the first carbon black and second carbon black into said polyamic acid solution to form a mixture, and delivering the mixture at a speed from 150 to 300 kg/hr from a T-die onto an endless belt to form a coating on the endless belt;
        wherein the endless belt is operated at a speed from 15 to 25 mpm;
    (4) thermally treating the coating to lead imidization; and
    (5) cooling to obtain the film for coverlay;
    wherein the film comprises 3 to 10 wt % of the first carbon black and 1 to 5 wt % of the second carbon black based on the total weight of the film;
    wherein the film has a light transmittance of 10% or less in the range of visible light, a gloss of 10 to 40%, and a thickness of 8 μm or less, and a coefficient of thermal expansion (CTE) of 10 to 20 ppm/° C.; and
    wherein one of the diamines is 1,4-phenylenediamine and the film comprises 20 to 30 mol % of 1,4-phenylenediamine based on the total diamines.
2. The method of claim 1, wherein said first carbon black and said second carbon black are mixed in a polar solvent to form a dispersion.
3. The method of claim 2, wherein said polar solvent is N,N'-dimethylformamide, N,N'-dimethylacetamide, or N-methyl-pyrrolidone.
4. The method of claim 1, wherein said dianhydrides are at least one selected from the group consisting of pyromel- litic dianhydride (PMDA), biphenyl tetracarboxylic dianhydride (BPDA), and oxydiphthalic anhydride (ODPA).

5. The method of claim 1, wherein the rest of said diamines is at least one selected from the group consisting of oxydianiline, 4,4'-methylenedianiline (MDA), and 1,3-bis(4-aminophenoxy)benzene (TPE-R).

6. The method of claim 5, wherein the film comprises oxydianiline.

7. The method of claim 1, wherein the film has a thickness of 5 to 8 μm.

* * * * *